Feb. 10, 1948. G. F. WITTGENSTEIN 2,435,705
DISC SLIDE RULE
Filed May 17, 1944
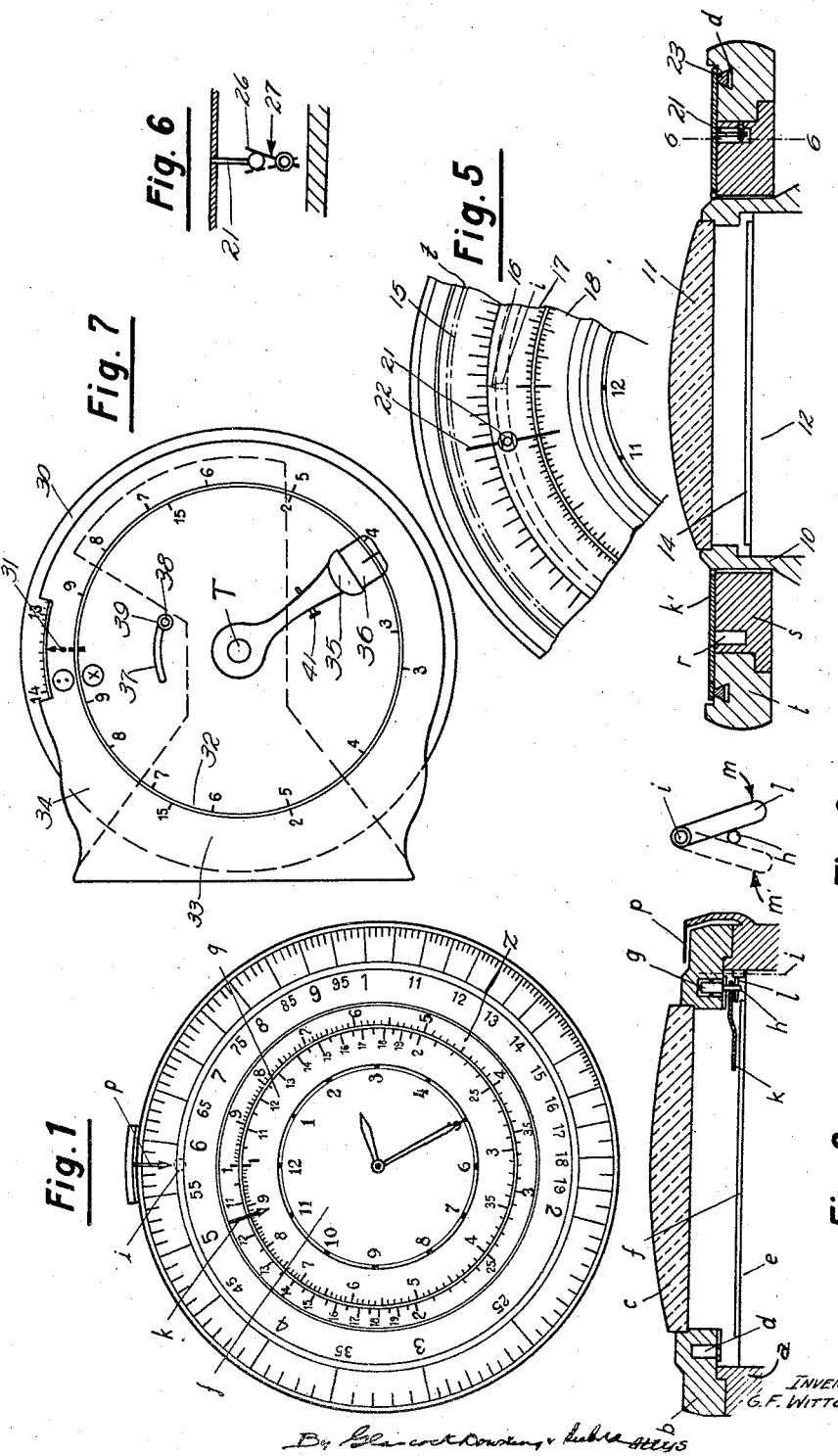
INVENTOR:
G. F. WITTGENSTEIN Patented Feb. 10, 1948

2,435,705

UNITED STATES PATENT OFFICE 2,435,705

DISC SLIDE RULE

Gérard Francis Wittgenstein, La Tour de Peilz, Switzerland

Application May 17, 1944, Serial No. 536,000
In Switzerland June 17, 1943

5 Claims. (Cl. 235—84)

The present invention relates to calculating devices and more particularly pertains to a circular slide rule mounted on a fixed support.

In the operation of a circular slide-rule it is necessary to rotate the apparatus one or several times in order to see the figures in their normal reading position. It is obvious that this drawback is a great handicap in the use of the circular slide-rule in spite of the superiority of the latter as compared with the rectilinear slide-rule, namely, that the movable scale never gets out of the range of the fixed scale.

This drawback becomes quite an obstacle when the slide-rule is fitted on a time-piece or a wrist-watch, the restricted movability of such a support provides an inverted arrangement of the figures of the movable scale which happen to be in the third or fourth trigonometric quadrant. When the slide-rule is arranged on a wrist-watch, it is difficult to provide for an easy operation of a second movable member such as a slider.

The purpose of the present invention is to obviate all these drawbacks. It is an object of the invention to provide a universal calculator with circular logarithmic scales which are so arranged that in all cases the operator can read the component figures and the result of the calculation without either changing the position of his head or turning the instrument in his hand, the said result always appearing in a predetermined spot judiciously chosen on the support, the latter being in an invariable position with respect of the operator.

The attached drawing shows by way of example several embodiments of the invention. Fig. 1 is a plan view of a wrist-watch combined with the logarithmic calculator. Fig. 2 is a vertical axial section thereof. Fig. 3 is an enlarged view of the control device of the sliding index enabling to bring it into coincidence with one of the factors of the calculation. Fig. 5 is a plan view of a logarithmic calculator mounted on the outside of an object such as a time-piece, a telephone dial framing, a watch, or more generally of any object apt to be used as a support; Fig. 4 is a vertical axial section of Fig. 5 and Fig. 6 is an enlarged section along 6—6 of Fig. 4 showing the control device of the sliding index for bringing it into coincidence with one of the factors of the calculation. Fig. 7 shows another embodiment of the slide-rule.

Referring to Figs. 1, 2 and 3, there is shown at $a$ a casing of a watch supporting a rotatable ring $b$ provided with a knurled rim. $c$ is the glass of the watch, $e$ the clock work, $f$ the dial carrying in addition to the hour scale a double scale. On the inner circle is traced a logarithmic scale $q$ extending from 1 to 10 on the 360°, the numerals 1 and 10 coinciding with one another, and the graduation reading in the direction of rotation of the watch hands. On the outer circle is traced a similar scale $z$ in the opposite direction extending also from 0 to 360°, or in other words a cologarithmic scale reading in the direction of rotation of the watch hands. Finally, a third scale similar to the first one or the scale Q on the ring $b$. When the ring $b$ is being rotated, the graduations thereon move under a fixed mark or pointer $p$.

In the example described, the fixed mark $p$ is purposely chosen in the prolongation of the radius passing through the noon of the watch. This radius determines also the common origin of the two fixed scales $q$ and $z$ of the dial and the vertical plane passing through this radius will be the main reading plane.

The knurled rim of the ring $b$ enables it to be rotated with the fingers.

A groove $d$ is cut in the ring $b$ and a slider $g$ fitted in this groove moves with the ring when the latter revolves in one direction or in the other. This motion of $g$, however, only lasts until its finger $h$ causes the lever $l$, which pivots around $i$, to abut against the stop $m$ or $m'$ according to the direction of rotation. The arrangement of these members is such that the sliding index $k$ always falls in the main reading plane at the moment of the abutment, whatever the direction of rotation of $b$. After the abutment, the slider cannot move any further, and when the operator continues the rotation of the ring $b$ the latter glides only.

The operation of the calculator is as follows:

One rotates the ring $b$ so as to bring the sliding index $k$ into the main reading plane, where it stops, automatically, and one then rotates the ring $b$ further so as to bring the first factor of the operation into the main reading plane, or under the fixed pointer $p$. The ring $b$ is then rotated in the opposite direction so as to bring the sliding index $k$ on the second factor of the calculation. The first factor is a multiplier or a divisor, while the second factor is a multiplicand read on the cologarithmic scale or a dividend read on the logarithmic scale of the dial. One reads the result on the scale of the ring in the main reading plane, as under the fixed mark $p$.

Thus if the numeral 51 is to be multiplied by the number 114 the ring $b$ carrying the index $k$ is rotated until the graduation 51 carried by the ring $b$ and the index $k$ are both aligned with the fixed pointer $p$. In this connection the index $k$ is arrested in the twelve o'clock position by the lever $l$, and the ring $b$ is moved further until the graduation 51 is under the fixed pointer. The ring $b$ is then turned in an opposite direction until the index $k$ overlies the multiplier or number 114 on the fixed or cologarithmic scale $z$ as shown in Fig. 1. This reversed rotation of the ring $b$ moves the finger $h$ away from the stop lever $l$ so that the index $k$ moves with the ring $b$. After the index $k$ is positioned in radial alignment with the number 114 on the scale $z$ the result or product of the multiplication is read on the scale carried by the ring $b$ under the fixed pointer $p$. This result is 5810 as shown in Fig. 1.

In order to divide 510 by the divisor 88 the ring $b$ is turned to move the index $k$ therewith the finger $h$ will engage the lever $l$ and the index $k$ is thereby arrested in the noon position. The ring $b$ is further rotated until the graduation 510 thereon lies under the fixed pointer $p$. The ring is then turned in an opposite direction and carries the index therewith until the index $k$ is radially aligned with the divisor 88 on the log scale $q$ as shown in Fig. 1. The result or quotient 5.81 may then be read on the movable scale under the fixed pointer $p$.

It is to be noted that the scale of the movable ring $b$ is always used in the vicinity of the main reading plane, so that it is sufficient that this scale, which may be simple or multiple, be visible in this sector only. This property enables one to dispose the scale under a fixed protection, which can be the dial of a time-piece, provided with the necessary indentures in the vicinity of the main reading plane.

It is of course possible to dispense with the automatic marking of the factor of the movable scale in the main reading plane and to point to this factor elsewhere.

A modification is shown in Figs. 4, 5 and 6. In this embodiment the watch casing is represented at 10 and the crystal or lense is shown at 11. The watch mechanism diagrammatically indicated at 12 is covered by a dial 14. The calculating mechanism is mounted outside the dial 14 and arranged concentrically thereof. The movable logarithmic scale is arranged on the ring $t$ knurled on its periphery and which can rotate around the crown $s$ mounted on the casing 10, by means of a thread for instance. The fixed pointer 16 and the two scales of 17 and 18 are traced on this crown $s$, provided with a groove $r$ enabling the circular displacement of the finger 21. A transparent Celluloid sheet $k'$ covers the three scales and carries the index 22. The slider 23 and the finger 21 are rigidly linked by the sheet $k'$. The fixed mark 16 and the origin of the two scales of 17 and 18 are in the main reading plane and the operation of this embodiment is similar to that already described.

In carrying out a calculation with this modification the ring $t$ is turned to align the multiplicand or the dividend graduation on the ring $t$ with the pointer 16. During such rotation of the ring $t$ the slider 23 and the index 22 move. Thus if the ring $t$ is turned in a clockwise direction from the position shown in Fig. 5 the index 22 is moved towards the twelve o'clock position. The finger 21 engages lever 26 and arrests movement of the slider and index 22 in radial alignment with the pointer 16. Further movement of the ring $t$ is then continued to position the desired graduation of the scale 15 in alignment with the pointer. Thereafter the ring $t$ is rotated in an opposite direction. The friction driving connection between the slider 23 and the ring $t$ then operates to move the index 22 with the ring $t$. The index 22 is then radially aligned with the desired multiplier on the scale 17 or the divisor on the scale 18. The result is then read at the pointer 16.

It is of course possible to omit the automatic indicating of the factor of the movable scale and to indicate the same by hand, and whatever it may be, for instance by preventing temporarily the rotation of $k'$ while one turns $t$ in such a way as to make coincide the said factor with the index 22.

It is of course also possible, if the convenience of certain supports require such a disposition, to trace only one single scale on the fixed member and to place accordingly the double scale on the movable member.

Fig. 7 shows another embodiment. The movable scale is traced on a disk 30 knurled on its periphery and fixed on a shaft T. 31 is as before the fixed mark. The unmovable double scales 32 and 33 are arranged on the face of the cover 34. The shaft T revolves with light friction in the axis of the cover 34 and drives, also with light friction, the slider 35 carrying the index 36. The front face of the cover is provided with a slot 37 along which can move the broach 38 fitted with with a washer 39. During its rotation, the finger 41 of the slider engages the washer 39 which is somewhere in the slot 37 and drives it until the broach 38 abuts against the end of the slot. The finger is dimensioned in such a way that, at this moment, the index is in the main reading plane.

One can displace the slide member by hand as far as the position of the main reading plane taking care that during this displacement the movable member be maintained immovable, for instance by providing it with a sufficient coefficient of friction.

I claim:

1. In a logarithmic calculator, a rotatable support adapted to be manually turned, a fixed support, a logarithmic scale and a cologarithmic scale on one of said supports, said scales having a common origin, a logarithmic scale on the other support, a fixed pointer located on a radius passing through the origin of the scales on the fixed support, a slide member normally movable with the rotatable support, an index carried by said slide member, and means for arresting movement of said slide member at a position where the index is radially aligned with the pointer without preventing further rotation of the rotatable support.

2. A logarithmic calculator according to claim 1 wherein the means for arresting movement of said slide member is so arranged as to permit movement of the index through at least 360 degrees.

3. A device according to claim 1 characterized by the feature that said slide member is movable by hand without altering the position of the rotatable support.

4. In a logarithmic calculator, a fixed support, a circular logarithmic scale on said support, a second support rotatable about the axis of said scale, a logarithmic scale arranged in a circle on said rotatable support and having a center common to the first scale, a fixed pointer arranged on a radius of said scales adjacent the scale graduation on the rotatable support, and radially aligned with the origin of the first scale, an index member normally moved by said rotatable support for radial alignment with graduation of the first scale, and means for arresting movement of said index member in radial alignment with said pointer during rotation of the rotatable support.

5. In a logarithmic calculator, a rotatable support adapted to be manually turned, a fixed support, a logarithmic scale and a cologarithmic scale on one of said supports, said scales having a common origin, a logarithmic scale on the other support, a fixed pointer located on a radius passing through the origin of the scales on the fixed support, a slide member normally movable with the rotatable support, an index carried by said slide member, and means for arresting movement of said slide member without preventing further rotation of the rotatable support.

GÉRARD FRANCIS WITTGENSTEIN.

REFERENCES CITED

The following references are of record in the file of this patent:

UNITED STATES PATENTS

| Number | Name | Date |
| --- | --- | --- |
| 845,463 | Hincks | Feb. 26, 1907 |
| 922,465 | Fenn | May 25, 1909 |
| 1,012,660 | Lange | Dec. 26, 1911 |
| 1,017,719 | Watts | Feb. 20, 1912 |
| 1,056,775 | Brunton | Mar. 25, 1913 |
| 1,075,124 | Scheibli | Oct. 7, 1913 |

FOREIGN PATENTS

| Number | Country | Date |
| --- | --- | --- |
| 688,492 | Germany | Feb. 22, 1940 |
| 204,559 | Switzerland | May 15, 1939 |